United States Patent
Rittenhouse

(10) Patent No.: US 7,640,648 B1
(45) Date of Patent: Jan. 5, 2010

(54) METHOD OF FABRICATING A MAGNETIC FLUX CHANNEL FOR A TRANSVERSE WOUND MOTOR

(76) Inventor: Norman Rittenhouse, 1001 N. First St., Fairbury, IL (US) 61739

( * ) Notice: Subject to any disclaimer, the term of this patent is extended or adjusted under 35 U.S.C. 154(b) by 0 days.

(21) Appl. No.: 12/134,251

(22) Filed: Jun. 6, 2008

Related U.S. Application Data

(63) Continuation-in-part of application No. 12/015,718, filed on Jan. 17, 2008, now Pat. No. 7,579,742.

(51) Int. Cl.
*H02K 15/00* (2006.01)
(52) U.S. Cl. .............................. 29/596; 29/598; 29/604; 29/605; 29/606; 29/607; 310/43; 310/194; 310/216.112; 310/257
(58) Field of Classification Search ................... 29/596, 29/598, 604–607; 310/43, 49 R, 194, 257, 310/216.112
See application file for complete search history.

(56) References Cited

U.S. PATENT DOCUMENTS

| | | | |
|---|---|---|---|
| 4,671,369 A | 6/1987 | Tiffin et al. | |
| 5,361,011 A * | 11/1994 | York | 310/194 |
| 5,533,587 A | 7/1996 | Dow et al. | |
| 5,647,721 A | 7/1997 | Rohrbaugh | |
| 5,834,865 A | 11/1998 | Sugiura | |
| 6,044,921 A | 4/2000 | Lansberry | |
| 6,220,377 B1 | 4/2001 | Lansberry | |
| 6,259,176 B1 | 7/2001 | Isozaki et al. | |
| 6,325,167 B1 | 12/2001 | Jiang | |
| 6,435,292 B2 | 8/2002 | Lemke et al. | |
| 6,860,571 B2 | 3/2005 | Scheetz | |
| 2001/0001993 A1 | 5/2001 | Lemke et al. | |
| 2003/0116364 A1 | 6/2003 | Simmons | |
| 2003/0116366 A1 | 6/2003 | Simmons | |
| 2003/0127258 A1 | 7/2003 | Lansberry | |
| 2004/0168837 A1 | 9/2004 | Michaud et al. | |
| 2006/0208601 A1 * | 9/2006 | Enomoto et al. | 310/257 |
| 2008/0018196 A1 * | 1/2008 | Enomoto et al. | 310/257 |

\* cited by examiner

*Primary Examiner*—Thiem Phan
(74) *Attorney, Agent, or Firm*—Brian S. Steinberger; Phyllis K. Wood; Law Offices of Brian S. Steinberger, P.A.

(57) ABSTRACT

Methods of fabricating a magnetic flux channel for a transverse wound electric motor by forming a ring of plural adjacent molded magnetic flux channel pole pieces and a second ring of opposite pole pieces. The two rings are mated such that each pole piece mates with an opposite pole piece to form magnetic flux channels and a c-shaped recess forms a winding channel for a transverse phase winding. After mating, the rings are bonded together to form a stator assembly of the transversely wound electric motor. The two rings may be approximately identical, or the two rings may be different as long as they mate to form the plural molded magnetic flux channels and the transverse phase winding channel. The molds may be designed to form the outer surface of a stator assembly. Molds of adjacent phases may be combined back-to-back to reduce part count and increase mechanical strength.

15 Claims, 11 Drawing Sheets

METHOD OF FABRICATING A MAGNETIC FLUX CHANNEL FOR A TRANSVERSE WOUND MOTOR

This application is a continuation-in-part of U.S. patent application Ser. No. 12/015,718 filed on Jan. 17, 2008, now U.S. Pat. No. 7,579,742 issued on Aug. 25, 2009.

FIELD OF THE INVENTION

This invention relates to transverse flux motors and, in particular, to methods, apparatus and systems for arranging and casting Molded Magnetic Flux Channels within a permanent female mold which houses and supports the stator assembly of a high efficiency direct drive high torque motor utilizing parallel pole molded magnetic flux channels with transverse flux stator windings, and separate stators for each phase.

BACKGROUND AND PRIOR ART

Approximately 93% of motors constructed use iron cores, or variations thereof, to concentrate magnetic flux and boost torque. "Coreless" motors are suited for very high RPM's with low torque and iron core motors usually utilize insulated steel laminations in their stators, which reduce heat losses from eddy currents. However, even with thinner laminations, the eddy currents are only blocked in one plane. So to further reduce eddy current losses, silicon is typically added to the steel to reduce its electrical conductivity. Although the silicon reduces some remaining eddy current losses (by reducing the current conductivity), the addition of silicon actually worsens the magnetic conductivity. This reduction of magnetic strength reduces the maximum amount of torque produced, and also reduces electrical efficiency.

Most prior art multi-phase motors use phase windings radially sequenced around the plane of rotation. The close-coupled proximity results in "Armature Effect" which reduces efficiency at higher speeds. The usual multi-phase high-speed motors also require a gearbox or other loss prone speed-reducing device in order to boost torque. Additionally, conventional motors use some variation of axial or radial flux, with multiple salient windings wound around iron type cores. Although this boosts magnetic flux, it also increases inductance and electrical resistance, and reactance. At higher speeds, the inductive and reactive losses limit top speed and efficiency at high speed.

Known prior art direct drive motors include U.S. Pat. No. 4,625,392 issued to Stokes on Dec. 2, 1986 titled Method of Manufacturing a Molded Rotatable Assembly for Dynamo-electric Motors, describes molding a rotor of a motor from magnetic material. However, it does not involve Transverse Flux and does not use molded material for the stator.

U.S. Pat. No. 4,853,567 titled Direct Drive Motor issued on Aug. 1, 1989, which describes a three-phase outer rotor motor. However, it uses conventional configuration with the three phase windings sequentially located within the same axis, and does not use Transverse Flux.

Transverse wound electric motors were first patented in 1895, and have evolved more slowly than conventional salient wound motors, due partly to material limitations. While nearly all salient wound motors use laminated magnetic structures to reduce eddy current losses and accompanied heating, this technique is not optimal to transverse wound motors.

U.S. Pat. No. 5,777,413 issued to Lange et al. on Jul. 7, 1999 titled Transverse Flux Motor with Magnetic Floor Gap, describes a locomotive motor with Transverse Flux. However, it uses conventional iron laminations as its flux path, and is mainly concerned with physically flattening the motor to allow it to fit into the space between the floor of the locomotive and the train axle.

Since every wire carrying electrical current produces magnetic flux, it is desirable to capture all or nearly all of this useful magnetic flux in producing useful work. In salient wound motors, this is commonly done, but most transverse wound stators waste about half of the potentially useful magnetic flux.

Prior art transverse flux motors have historically been too costly to construct, and have rarely been used. This invention simplifies construction and lowers costs of Transverse Flux motors, and at the same time increases electrical efficiency to a higher level than before.

The motor of co-pending U.S. patent application Ser. Nos. 11/731,427 filed on Mar. 30, 2007 and 12/015,718 filed on Jan. 17, 2008 (incorporated herein by reference) overcome the problems with prior art motors by using separate, independent, uncoupled planes for each phase, as well as phase and pulse timing to eliminate the "Armature Effect" which results in much higher efficiency at higher speed. The novel motor also has very high torque and can drive directly most loads (such as vehicle tracks, wheels, or propellers) without requiring clutches, gearboxes, or other speed reducing devices. The result is greater efficiency, lower costs, and fewer moving parts.

The co-pending U.S. patent application Ser. No. 12/015,718 also overcomes prior problems associated with boosting magnetic flux, which increases inductance and reactance and at higher speeds, the inductive losses limit top speed and efficiency at high speed. The direct drive motor of the present invention can use radial flux construction, but the preferred embodiment is Transverse Flux construction. In Transverse Flux construction, one large single winding powers each phase. Because magnetic flux is directly proportional to Ampere-Turns, the same magnetic flux can be achieved with more turns with less amperage, or higher amperage and fewer turns. In the preferred embodiment, this novel motor has fewer turns, and higher amperages. With fewer turns, the inductance is less, and with larger copper conductors the electrical resistance is less also. Since the inductance and resistance are reduced, both the inductive losses and the resistive losses are greatly reduced which results in higher efficiency and also a much higher usable speed range.

Advantages of the Molded Magnetic Flux Channels disclosed in co-pending U.S. patent application Ser. Nos. 11/731,427 and 12/015,718 include capturing and channeling nearly all magnetic flux produced by the Transverse Winding to the Pole Piece where the Magnetic Flux interacts with the Permanent Magnetic Rotor through the Air Gap. Another advantage is that since the magnetic material is molded from high permeability powder, rather than being assembled from sheets of laminations, the eddy currents are blocked in all three planes, rather than only on one; the shape of the Magnetic Path can be advantageously shaped to maximize magnetic transfer to the Pole Pieces, and to minimize the flux leakage between poles of opposite polarity; and the Parallel Pole MMFC allows the simultaneous use of every magnetic on the rotor, rather than every other one in other Transverse Wound Motors. Using every available magnet increases Torque, Power and Efficiency.

This invention provides a novel method and systems for arranging and casting Molded Magnetic Flux Channels within a permanent female mold which ultimately houses and supports the stator assembly of a Transversely Wound Stator.

The Molded Magnetic Flux Channels is a uniquely shaped magnetic structure designed to capture, focus, and direct magnetic flux to or from a transverse wound stator to or from a magnetic air gap between the non moving stator and the moving rotor or armature. The subject female mold can be built preferably by using 3-D rapid prototype machines, or cast by the lost wax technique.

SUMMARY OF THE INVENTION

A primary objective of the invention is to provide methods, apparatus and systems for arranging and casting Molded Magnetic Flux Channels within a permanent female mold which ultimately houses and supports the stator assembly of a Transversely Wound Stator.

A secondary objective of the invention is to provide methods, apparatus and systems for a Molded Magnetic Flux Channel that is a uniquely shaped magnetic structure designed to capture, focus, and direct magnetic flux to or from a transverse wound stator to or from a magnetic air gap between the non moving stator and the moving rotor or armature.

A third objective of the invention is to provide methods, apparatus and systems for Molded Magnetic Flux Channels with increased mechanical strength, reduce part count, reduced manufacturing cost. In an embodiment, the entire group of Molded Magnetic Flux Channels is built as one piece, eliminating assembly entirely.

A fourth objective of the invention is to provide methods, apparatus and systems for Molded Magnetic Flux Channels using a female mold fabricated using 3-D rapid prototype machines, or cast by the lost wax technique.

The present invention overcomes problems associated with the prior art and provides Molded Magnetic Flux Channels for a stator assembly of a transversely wound stator including the following advantage:

1. Greater mechanical strength between magnetic members, between magnetic members and hub assembly, and greater resistance to vibration.

2. Ease of production

3. Precise magnetic clearances and spacing.

4. One piece assembly of stator and hub, with large 3-D rapid prototype builder.

5. Superior heat dissipation of winding and Molded Magnetic Flux Channels

6. Little or no losses from eddy currents in Molded Magnetic Flux Channels

7. Extreme high efficiency of completed motor/dynamo

8. Working Magnetic Air Gap very precisely controlled.

9. Lights out manufacturing-design lends itself to robotic construction

10. Centrifugally cast Molded Magnetic Flux Channels assure very high density of magnetic powder.

11. Epoxy matrix centrifugally permeated into powdered magnetic material during process assures stability and mechanical strength.

12. With very large stators, individual Molded Magnetic Flux Channels are assembled and epoxied with zero mechanical gap between female Molded Magnetic Flux Channel shell, assuring increased mechanical strength and greater heat dissipation. With smaller stators, the mechanical gap is non existent because they can be built in one solid piece.

13. Female Molded Magnetic Flux Channels mold can be constructed automatically with 3-D rapid prototypers using laser method, photosetting plastic method or thermal build process.

14. With large enough 3-D rapid prototyper machine, entire stator female half-shell can be built in one piece automatically.

15. For larger Molded Magnetic Flux Channels or when greater magnetic strength at the pole pieces is desired, high permeability insulated wire bundles can be fitted into the female mold before the powdered magnetic material is added.

16. The epoxy matrix can be cured by Ultraviolet Light, or by conventional two part (resin and hardener) mixing process.

A fifth objective of the invention is to provide methods, apparatus and systems for a very high efficiency direct drive high torque motor utilizing Parallel Pole Molded Magnetic Flux Channels with Transverse Stator Windings.

A sixth objective of the invention is to provide methods, apparatus and systems for a high efficiency direct drive high torque motor constructed using Parallel Pole Molded Magnetic Flux Channels, which increases the overall efficiency by greatly reducing eddy currents in all planes.

A seventh objective of the invention is to provide methods, apparatus and systems for a high efficiency direct drive high torque motor using Parallel Pole Molded Magnetic Flux Channels to reduce cost, and make possible more magnetically efficient shapes which results in higher overall efficiency.

An eighth objective of the invention is to provide methods, apparatus and systems for a high efficiency direct drive high torque motor that uses radial flux construction, but the preferred embodiment is Transverse Flux construction. In Transverse Flux construction, one large single winding powers each phase. This reduces the complexity and losses typically encountered with multiple salient type windings.

A ninth objective of the invention is to provide methods, apparatus and systems for a high efficiency direct drive high torque motor with fewer turns, and higher amperages. With fewer turns, the inductance is less, and with larger copper or aluminum windings the electrical resistance is less also. Since the inductance and resistance can be much less, both the inductive losses and the resistive losses are greatly reduced. The result is higher efficiency and also a much greater usable speed range.

A tenth objective of the invention is to provide methods, apparatus and systems for a Transverse Flux motor having a simplified construction and lowered costs, and at the same time increases electrical efficiency to a higher level than the prior art.

An eleventh objective of the invention is to provide methods, apparatus and systems for a Transverse Flux motor that does not have external magnetic fields and produces negligible radio-frequency RF noise.

A twelfth objective of the invention is to provide methods, apparatus and systems for a Transverse Flux motor for use as a wheel motor. A tubeless tire can be mounted on the rotor drum and the tubeless tire can be partially filled with a liquid coolant that then cools the rotor drum and attached permanent magnets.

A thirteenth objective of the invention is to provide methods, apparatus and systems for a Transverse Flux motor, using Parallel Pole Molded Magnetic Flux Channels and separate stators for each phase, having sufficient torque to directly power track wheels, wheel motors, marine propellers, or wind turbines.

A fourteenth objective of the invention is to provide methods, apparatus and systems for a Transverse Flux motor for use as a high efficiency motor, high efficiency generator, or a dynamo. The motor may also be used as a synchronous motor.

The co-pending U.S. patent application Ser. No. 12/015,718 filed on Jan. 17, 2008 overcomes the problems with the prior art and provides a motor that achieves high efficiency (98% demonstrated) and has the following advantages:

1. Near Elimination of eddy current loses in stator.

2. Greatly reduced hysterisis losses in stator.

3. Significant reduction of conductor resistive (IR) losses.

4. Reduction of inductive losses.

5. Elimination of phase "armature effect" losses.

6. Elimination of previously required mechanical or hydraulic power transmission losses, previously necessary to achieve high torque with low RPM.

7. Reduced complexity and lowered cost of construction of Transverse Flux Motors.

A first preferred embodiment of the invention provides a method of fabricating a magnetic flux channel for a transverse wound electric motor by forming a ring of plural adjacent molded magnetic flux channel pole pieces and a second ring of opposite plural adjacent molded magnetic flux channel second pole pieces, each ring having a c-shaped recess. The two rings art mated such that each first pole piece mates with one of the opposite pole pieces to form magnetic flux channels and the c-shaped recesses mate to form a winding channel for housing a transverse phase winding. After mating, the two rings are bonded together with a bonding agent to form a stator assembly of a transversely wound electric motor.

Two three-dimensional molds are created for forming the two rings of plural adjacent molded magnetic flux channel first pole pieces. In one embodiment the two rings are approximately identical. However, the two rings may be different as long as they mate to form the plural molded magnetic flux channels and the transverse phase winding channel. The three-dimensional mold are fabricated using a 3-D rapid prototyper or using a lost wax casting to create the first and second three-dimensional mold, or other molding making technique that is known in the art. The molds may be designed such that the molds form the outer surface of stator assembly of the transversely wound electric motor.

In a preferred embodiment, the three-dimensional molds are formed with an alignment protrusion on an exterior surface the plural pole pieces and forming an interior perimeter of the rings for aligning the magnetic flux channels with a hub of the transversely wound electric motor. The alignment protrusions may be offset by calculating an offset according to 360 divided by the number of pole pairs, divided by the number of phases in a multiphase motor and offsetting the alignment protrusions to produce electrical phase difference between phases of the multiphase transversely wound electric motor. Alternatively, a mechanical offset is calculated by dividing 360 by one-half of a number of poles per phases in a multiphase motor to produce a quotient, dividing the quotient by a number of phases of a multiphase motor to produce the mechanical offset and offsetting the alignment protrusions to produce degrees of mechanical offset between phases of the multiphase transversely wound electric motor.

In another embodiment, the three-dimensional molds are designed as an outer shell of the stator assembly. In yet another embodiment, the mold design includes forming each molded magnetic flux channel first and second pole piece to have a rounded exterior surface opposite the c-shaped recess to prevent magnetic debris from entering the structure and a gap between mated first and second pole pieces. In yet another embodiment, the dimension of a transverse phase winding is determined and the c-shaped recess interior surface of the rings is designed to the dimensions of the transverse phase winding.

In an embodiment the mating step includes placing the transverse phase winding in one of the transverse winding channel formed by the c-shaped recesses in the first and second ring and filling the transverse winding channel with a filling material to encapsulate the transverse phase winding to form a solid filled transverse winding channel for dissipating heat. After the rings are mated, the rings are bonded together to form the molded magnetic flux channels. In an embodiment the rings are bonded with an epoxy to form one solid stator assembly of a transversely wound electric motor.

The magnetic gap between each first pole piece and mated second pole pieces may be filled with a magnetically inert material after bonding. At least one of a magnetic powder, a bundle of high permeability wires and a bundle of insulated high permeability wires or tapes may be used for filling the magnetic channel. The bundle of high permeability wires and tape may a high permeability material selected from a group consisting of iron and iron-cobalt or alternatively, be a high permeability material such as purified iron wire, purified iron tape, soft annealed iron wires, soft annealed iron tapes or a high permeability alloy annealed in hydrogen and coated with insulation to add magnetic conduction, to reduce eddy currents, and to increase uniformity of the magnetic flux density at the plural first and second pole pieces. The molded magnetic flux channels may be centrifugally filled with a filling material or by using differential air pressure to fill the remaining space with a greater density. Or the method may include filling each molded magnetic flux channel with at least one of a bundle of insulated high permeability wires and a bundle of insulated high permeability tapes and filling a remaining space in each molded magnetic flux channel with a powdered magnetic material binding material mixture to eliminate eddy currents.

Further objects and advantages of this invention will be apparent from the following detailed description of preferred embodiments that are illustrated schematically in the accompanying drawings.

DESCRIPTION OF THE PREFERRED EMBODIMENTS

Figure 1:
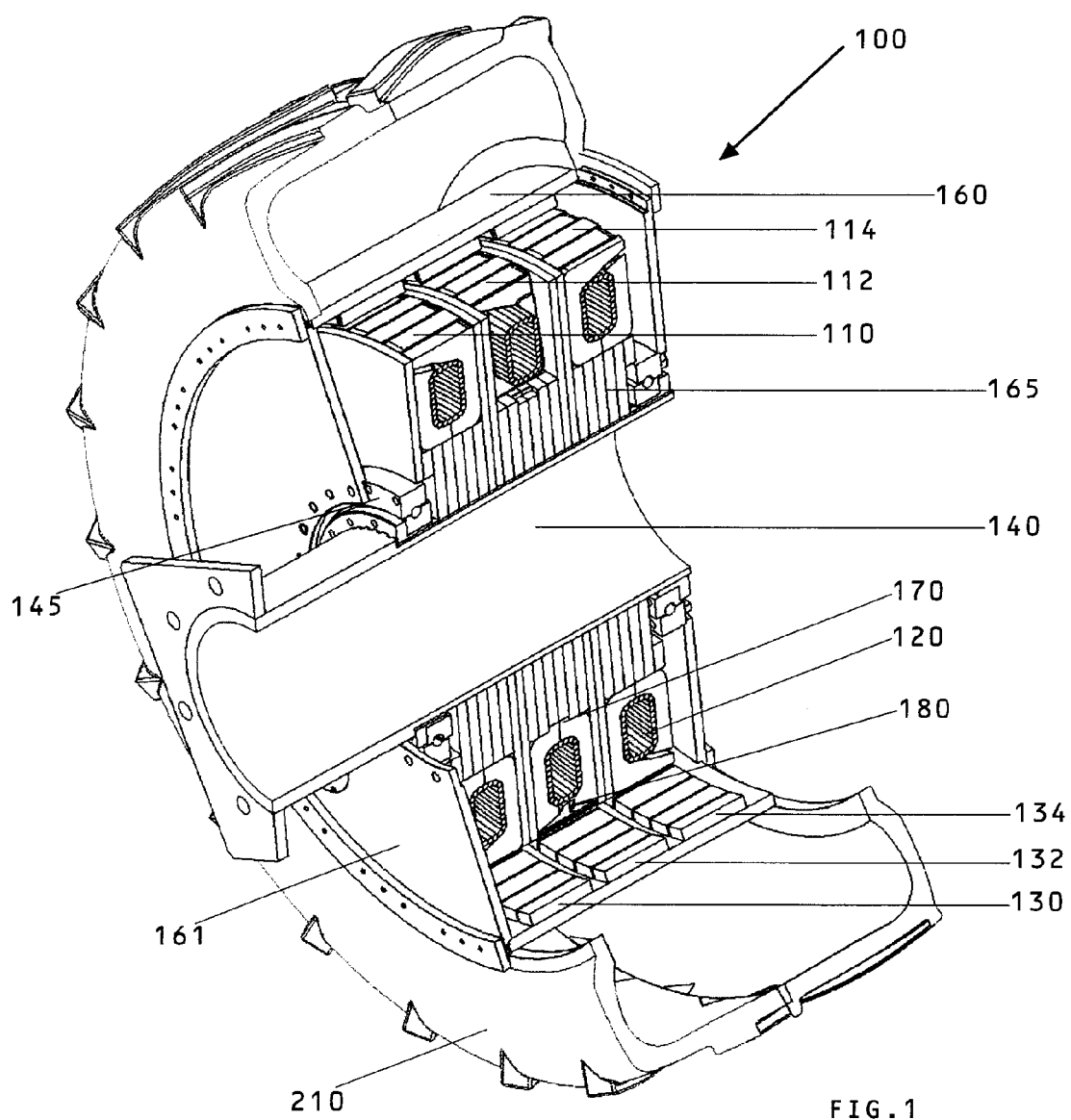
FIG. 1 is a cross sectional perspective drawing of a wheel motor having three phases according to the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | | | |
|---|---|---|---|
| 100 | motor | 106 | bundle of insulated wires |
| 104 | mold and stator housing | 107 | bundle of insulated iron tape |
| 108 | matrix of powder or binder | 162 | mounting shaft hole |
| 110 | pole pieces, phase "A" | 165 | hub |
| 112 | pole pieces, phase "B" | 170 | locating key |
| 114 | pole pieces, phase "C" | 172 | north parallel pole piece |
| 120 | transverse wire winding | 174 | south parallel pole piece |
| 130 | row of magnets, Phase "A" | 175 | hollow core |
| 132 | row of magnets, Phase "B" | 177 | air gap |
| 134 | row of magnets, Phase "C" | 200 | wheel motor |
| 140 | mounting shaft | 210 | tire |
| 145 | bearing | 220 | location ridge |
| 150 | Magnetic Flux Channels | 222 | machined axial flats |
| 160 | magnetic drum outer shell | 224 | epoxy powdered iron binder |
| 161 | rotating side plate | 180 | air gap |

The method, system, apparatus, and device of the present invention provides a high efficiency, direct drive, high torque motor utilizing Parallel Pole Molded Magnetic Flux Channels with transverse windings, with separate stator assemblies for each phase. One separate stator for each phase increases available magnetic flux and magnetic flux area.

According to the present invention, the motor can be either stator outside or rotor outside and the motor utilizes separate multiple phase windings. In a preferred embodiment, the motor includes at least three phases. FIG. 1 is a cross sectional perspective view of a direct drive high torque motor having three phases according to a preferred embodiment of the present invention. As shown, the direct drive motor 100 includes three phases A, B and C each having plural Parallel Pole Molded Magnetic Flux Channels that form plural pairs of pole pieces 110, 112 and 114 with a copper or aluminum transverse winding 120A, 120B and 120C and magnet rings 130, 132 and 134 corresponding to each phase A, B and C, respectively, that are fixedly attached on an interior surface of a rotating drum 160.

The Parallel Pole Molded Magnetic Flux Channels replace conventional laminated silicon steel as the flux-concentrating device. The Parallel Pole Molded Magnetic Flux Channels, in combination with the improved magnetic shapes captures and delivers more available flux to the parallel pole pieces. Additionally, the high precision molded part decreases construction cost of transverse flux motors.

The pole pieces 110, 112 and 114 are fixedly attached to a hub attached to center non rotating mounting shaft 140 having bearings 145 around each end of the non-rotating mounting shaft 140. Each phase corresponds to one single row of pole pieces and one row of permanent magnets. Permanent magnets are placed in one row alternating north and south poles for each phase. For example, phase A includes north and south pole pieces 110 which are coupled with one single row of magnets 130 that are mounted on the interior surface of the rotating drum 160. The non-rotating mounting shaft 140 may be hollow for routing power cables, signal cables, or both. In an alternative embodiment, the hollow non-rotating mounting shaft 140 also includes liquid or air coolant lines.

Figure 2:
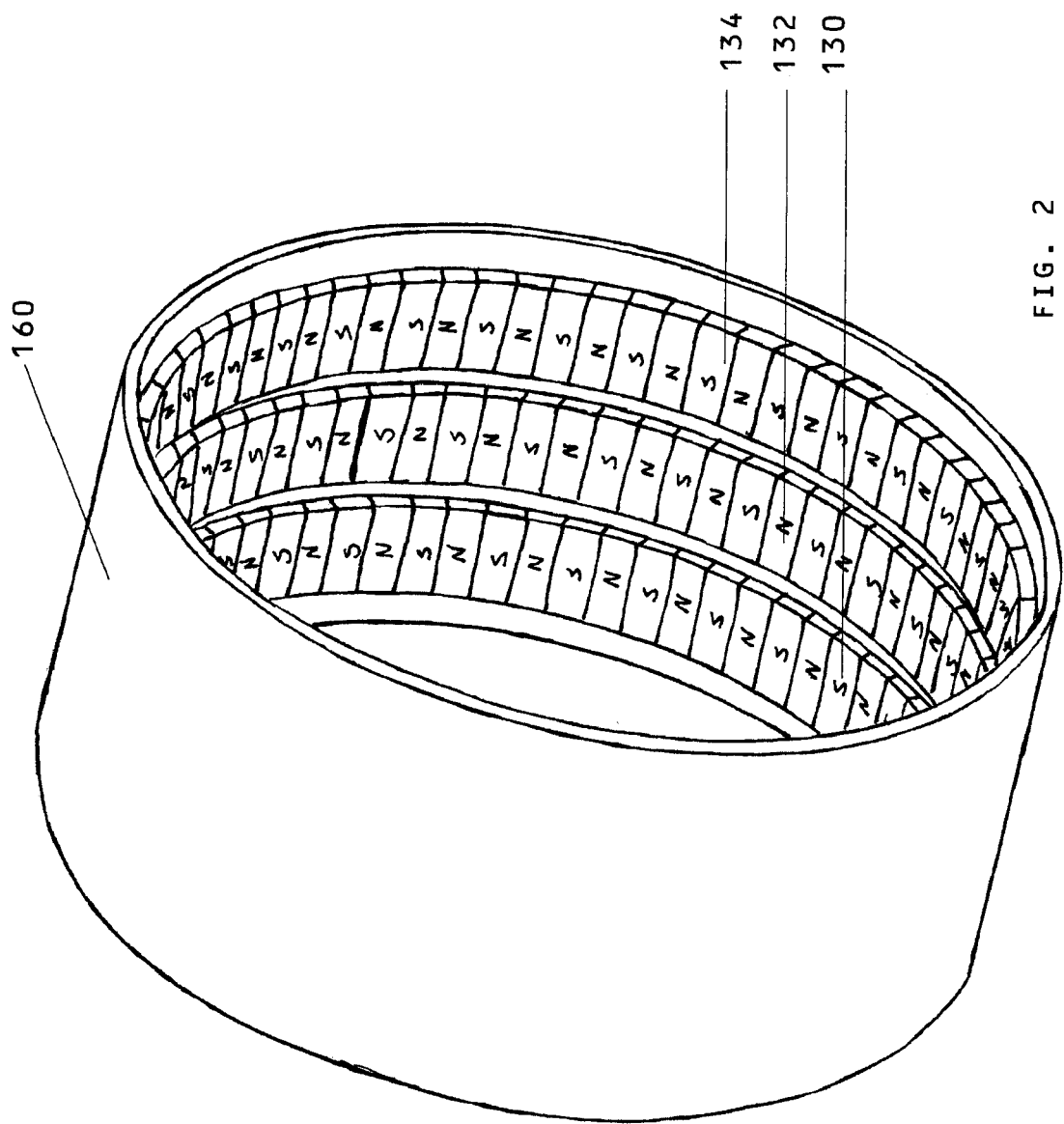
FIG. 2 is a perspective side view of the outer rotor shell, showing one row of magnets alternating North and South for each phase of the motor.

FIG. 2 shows a perspective view of the interior surface of the rotating drum 160. As shown, each phase includes one single row of permanent magnets that alternate between north and south poles. The drum to which the permanent magnets are attached is the main moving part, which increases the reliability of the motor. In an embodiment, the motor is sealed from external elements. With appropriate seals, the motor can be used underwater.

Preferred empowerment of rotor outside construction allows permanent magnets 130 to be bonded with special epoxy containing powdered iron to reduce the magnetic air gap between the outer surface of the permanent magnets and the inner surface of the outer steel housing to permit more economical construction by allowing the use of flat magnets rather than requiring the more expensive radially curved magnets. The one row of permanent magnets for each phase enhances the transverse flux design by eliminating the complexity of the return flux circuit elements required in prior art systems, which improves torque, efficiency and reduces demagnetizing flux leakage or fringing.

The motor uses any even high number of poles, eight or more, and in a preferred embodiment, the motor includes between 32 and 360 or more poles. Increasing the number of poles result in higher torque at lower speeds. In the preferred embodiment, two or more phases may be used with each phase having a separate radial circle of Parallel Pole Molded Flux Channels and its energizing coil. Typically, three or more phases are used, with higher numbers giving increased running torque and less cogging torque.

Increased efficiency of the motor is improved by physically separating each phase winding, parallel pole molded magnetic flux channels and poles, and permanent magnets, from the other phase windings, and associated parts.

Figure 3:
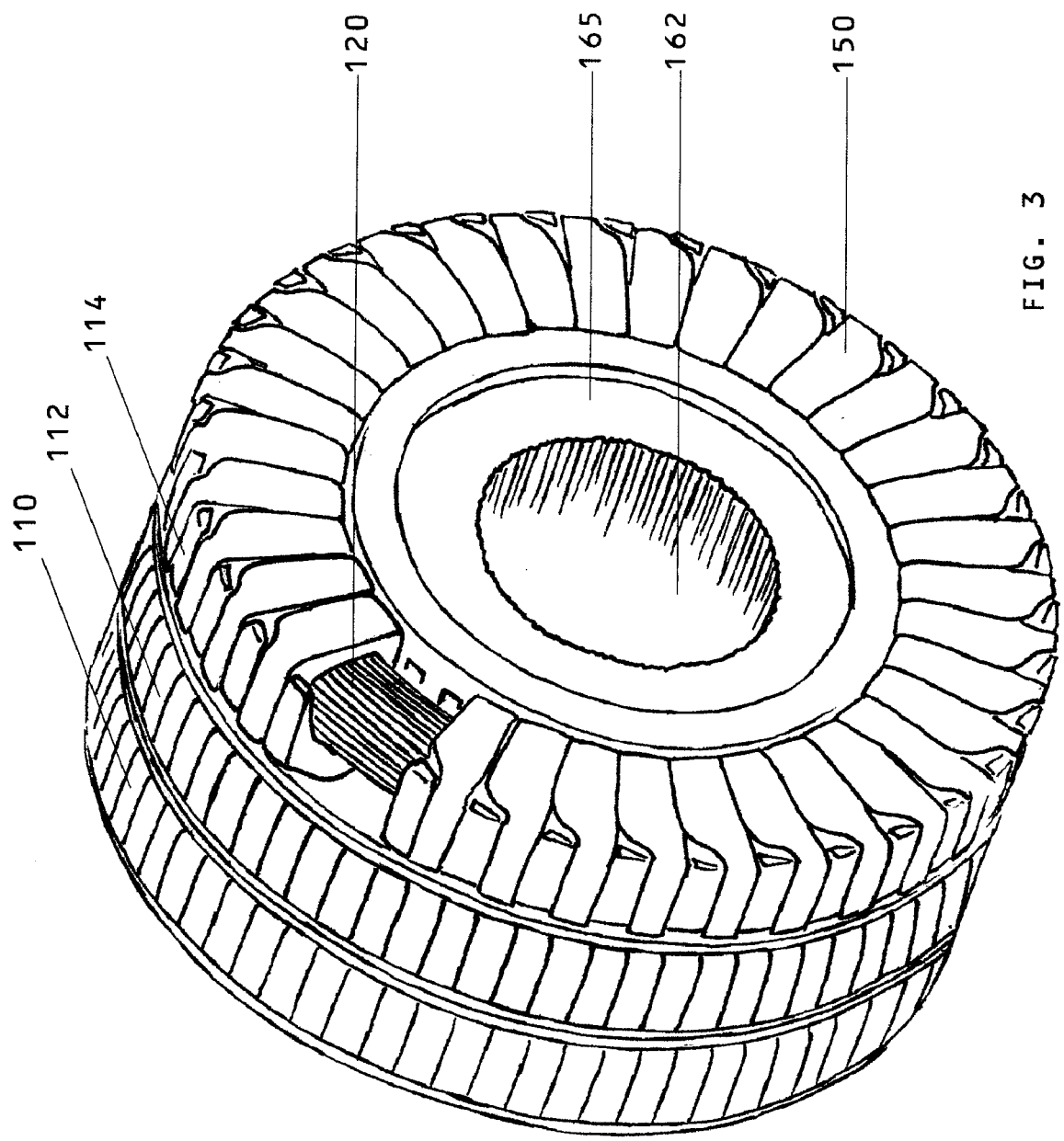
FIG. 3 is a perspective side view of an example of a three-phase assembly showing multiple Parallel Pole Molded Flux Channels mounted to a fiberglass hub, with several Flux Channels removed to show the transversely wound copper or aluminum winding.

FIG. 3 is a perspective side view of the Parallel Pole Molded Magnetic Flux Channels 150 attached to a hub 165. In a preferred embodiment the hub is fiberglass although alternative non-magnetic, non-conductive materials may be substituted. As shown, there are plural Parallel Pole Molded Magnetic Flux Channels 150 around the outer edge of the fiberglass hub 165 with a shaft mounting hole 162 in the center. Fabrication of the non-rotating hub with non-conductive, non-magnetic material eliminates eddy currents in the hub and reduces the weight of the motor.

In one embodiment, the non-rotating hub 165 includes one disc for each phase; alternatively, the molded magnetic flux channels for all of the phases are mounted on one larger non-magnetic, non-conductive cylinder. FIG. 3 also has several parallel pole molded magnetic flux channels removed to show the transverse winding 120 located inside the Parallel Pole Molded Magnetic Flux Channels 150 that are attached to the hub 165. As shown, the molded magnetic flux channels contain a curved tunnel for housing the transverse flux producing coil winding. Losses due to interconnection splices between individual stator coils are eliminated due to the elimination of multiple coils per phase. Each phase coil has a minimum of two terminals or a larger number for voltage taps or series/parallel connection. In an alternative embodiment, the parallel pole molded magnetic flux channels also include non-conductive coolant lines or hollow coils for direct circulation of coolant.

Typical IR losses are greatly reduced by replacing multiple conventional salient windings used in prior art motors with one continuous coil of large diameter wire. Using one coil winding per phase winding also reduces typical inductive losses. The configuration of the present invention practically eliminates stray flux lines by substantially surrounding the phase coil winding 120 with parallel pole molded magnetic flux channels 150, which conduct the captured flux directly to the individual parallel pole molded pole pieces. Additionally, transverse windings with molded magnetic flux channels eliminate internal connections, splices and efficiency wasting circulating currents usually encountered with salient wound motors and eliminating salient wound coils eliminates wasted flux from wire end paths and reduces assembly costs. Coil winding costs are also reduced. Nearly all flux emitted from the transverse coil is captured and utilized to increase efficiency. The motor of the present invention has higher efficiency and higher torque than conventional salient wound radial flux or axial flux designs, and full torque is available from a dead stop to a high range of RPM's.

In a three-phase version of the present invention, either the stators may be offset 120 electrical degrees from each other with the magnets aligned or the motor magnets may be offset 120 electrical degrees from each other with the stators aligned. Separate Stators spaced at 120 electrical degrees for a three-phase motor, greatly reduces magnetic distortion usually called Armature Effect, which allows higher efficiency at higher speeds. Mechanically, the offset between phases depends on the number of poles per the following formula:

Offset=360/number of pole pairs/number of phases.

Thus for a 60 pole motor with three phases:

Offset=360/30=12 degrees divided by 3=4 degrees

Figure 4:
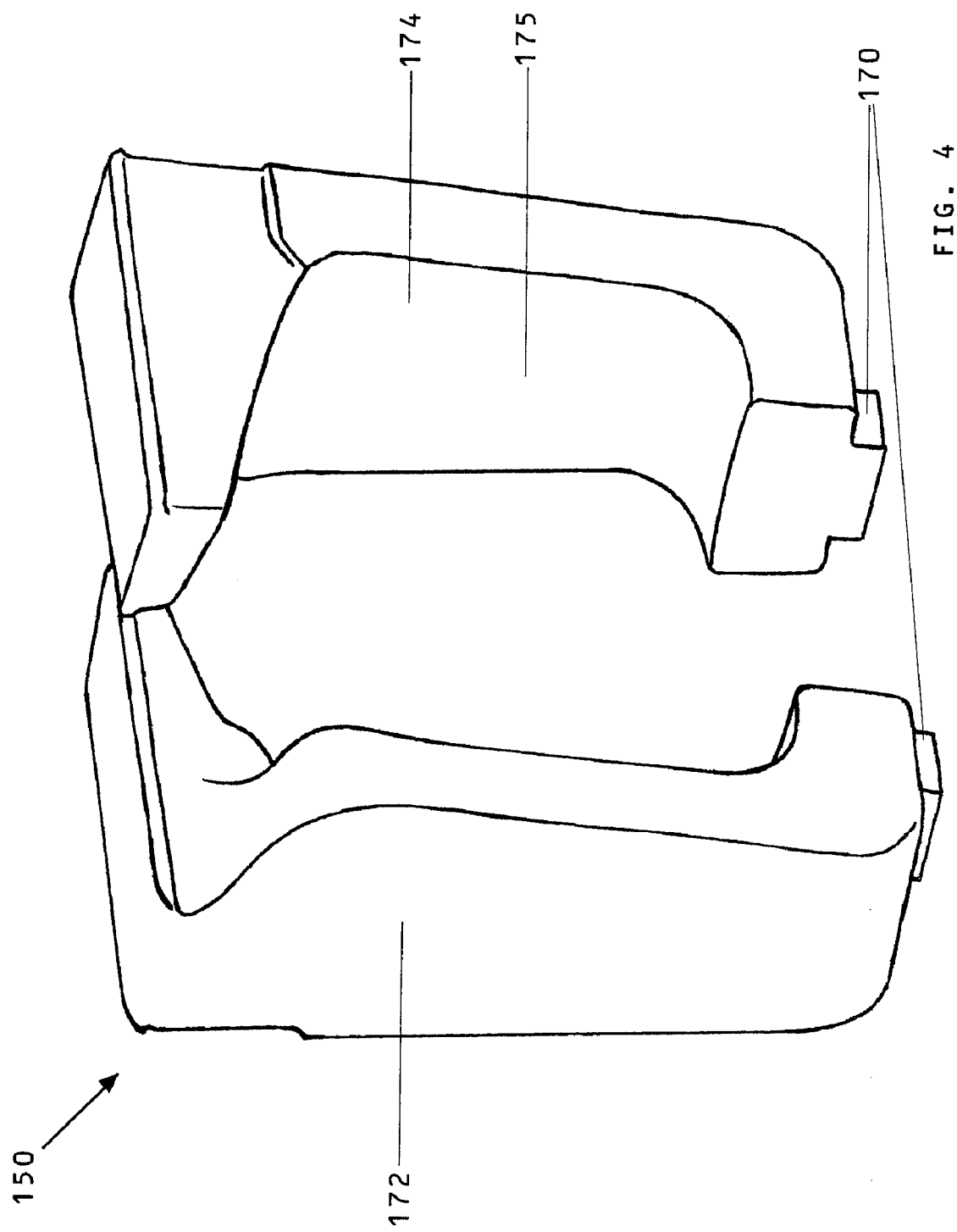
FIG. 4 is a perspective exploded view of a Parallel Pole Molded Magnetic Flux Channel showing the copper or aluminum winding tunnel, the two parallel pole pieces and the locating pin.

FIG. 4 is a perspective side view of the Parallel Pole Molded Magnetic Flux Channel 150, and the winding which supplies the transverse flux. This configuration includes locating keys 170 corresponding to each adjacent molded magnetic flux channel. The locating keys 170 allow precision placement of the plural molded magnetic flux channels. Hysteresis losses in the stator are greatly reduced by elimination of typical laminated silicon iron, and construction of the Parallel Pole Molded Magnetic Flux Channels 150 of high permeability, high flux density conducting hard or soft ferrite materials, sintered iron-nickel alloy, amorphous alloys or similar molded products.

These molded magnetic flux channels may be constructed of materials such as ferrite, iron-nickel sintered alloy or can be fabricated with imbedded insulated iron wire bundles. Since the Molded Magnetic Flux Channels are electrically non-conductive of electrical current, eddy currents are virtually non-existent. The high permeability, low conductivity parallel pole molded magnetic flux channels increase torque and increase efficiency.

The preferred embodiment of the present invention eliminates eddy current and hysteresis losses in the stator hub by constructing the hub of non-conductive, non-metallic material such as fiberglass and eliminating bolts, clamps, nuts, clips, and other metal parts. Mounting the Molded Magnetic Flux Channels in magnetically inert material such as fiberglass eliminates hysteresis losses in the mounting core, reduces weight, increases insulation resistance, and reduces electromagnetic interference. The preferred embodiment of the stator also substantially eliminates core losses caused by eddy current, by eliminating conventional laminations and conventional pole pieces to carry the magnet lines of force. Another advantage of using the molded magnetic flux channels is reduction of eddy current heating losses.

Figure 5:
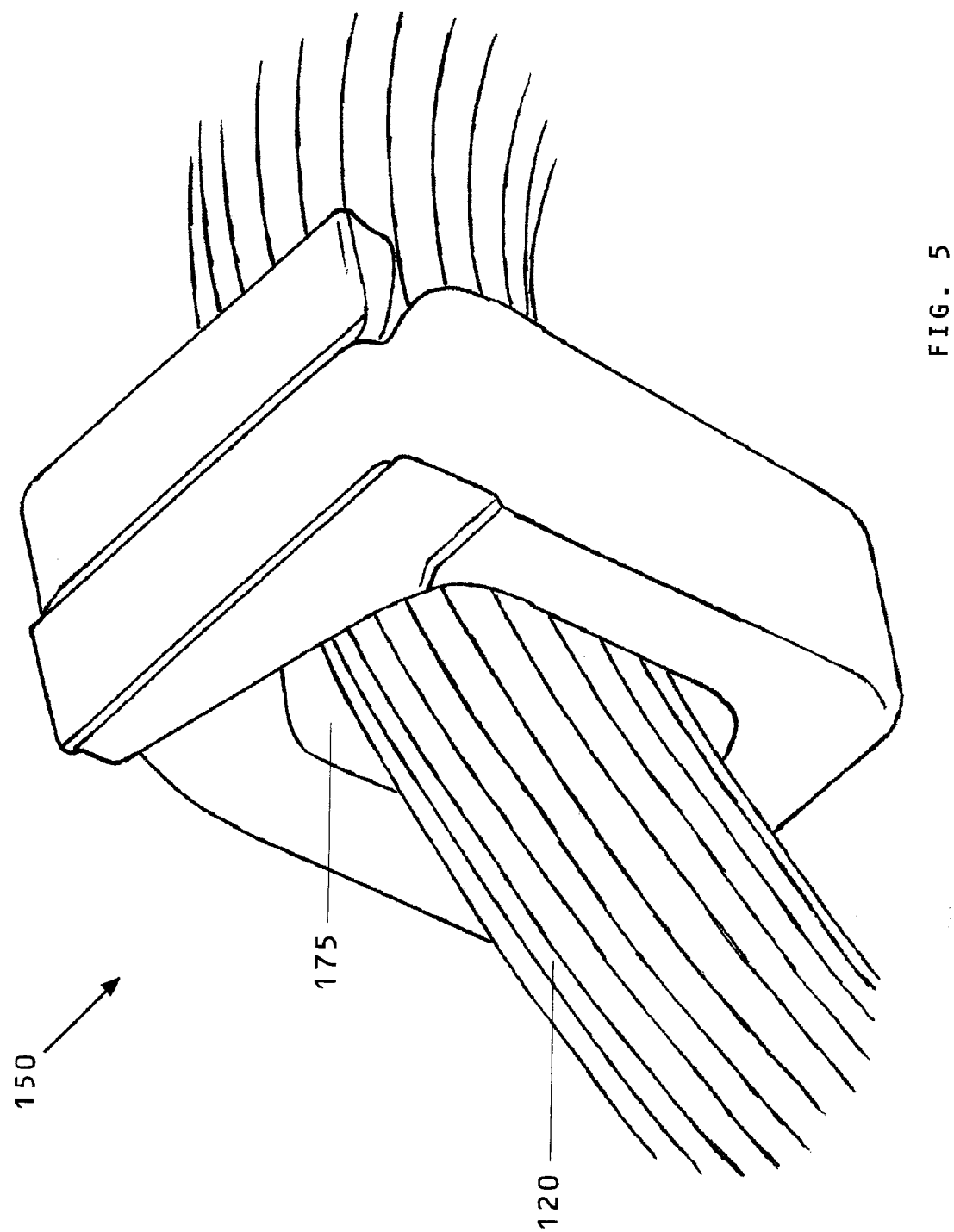
FIG. 5 is another perspective view of a Parallel Pole Molded Magnetic Flux Channel of FIG. 4 from a different angle, with the transversely wound conductive wire running through the winding tunnel.

A perspective view of a molded magnetic flux channel 150 that forms a pair of pole pieces 110 is shown in FIG. 4. Each magnetic flux channel 150 is molded to have a hollow core 175 for the transverse conductive winding 120. As shown, the molded-magnetic flux channel 150 includes two mating pole pieces, a north pole piece 172 and a south pole piece 174. When the current through the transverse winding reverses, the parallel poles switch magnetic polarity. On the exterior base of each pole piece is a portion of the locating key 170, which when mated form the locating key 170 that is used for mounting plural molded-magnetic flux channels 150 to the hub 165 as shown in FIG. 1. In an embodiment, the upper portion of the pole pieces is approximately twice the length of the bottom portion and top interior portion of the north and the south pole pieces are angled so that the entire length of the upper north pole piece 172 mates with the south pole piece as shown in FIG. 5 without contacting. In this embodiment, the base of each pole piece is approximately one-half the length of the upper portion so that then the north and south pole pieces are mated they form the channel 175 for the transverse winding 120 as shown in FIG. 5. The mirror image design of the north and south pole pieces permits easy assembly of stator by mating the halves of the molded-magnetic flux channel around the transverse winding, and also reduces the part count.

The shape of the flux member made possible with molded-magnetic flux channels maximizes the space between adjacent members of opposite magnetic polarity while maintaining approximately the same cross sectional area by increasing length of each top portion where the width is decreased to reduced magnetic flux leakage and fringing. Additionally, the magnetic leakage between pole pieces is reduced due to shape of undercut faces of poles. In another embodiment, the pole pieces are formed to include an air gap 177 between pole piece 150 and permanent magnet 130, 132 and 134. Unlike the prior art, the Parallel-Pole Molded Magnetic Flux Channel captures flux of each rotating magnet, rather than from every other magnet.

The shape of the mated flux channel allows the flux channel to surround its transverse conductor for transmitting the captured magnetic flux and focusing it at parallel pole pieces facing the rotating permanent magnets. The shape also allows efficient transference of magnetic flux from pole piece 172 and 174 to transverse conductor 120 without saturation of magnetic member 170 in Dynamo duty and the parallel-pole molded magnetic flux channel captures approximately all-available magnetic flux of the transverse conductor and efficiently conveys it to the parallel poles as a motor. Increasing the cross sectional area of the magnetic conductor area according to the desired magnetic flux density allows efficient transference of magnetic flux from the transverse conductor to the pole piece without saturation of the magnetic member. Since the magnetic flux channels are molded, modification of the mold allows the designer to design the parallel pole magnetic pole pieces to meet different specifications.

The advantages of the molded magnetic pole pieces of the present invention is not possible with the prior art construction using thin stamped sheets of iron, called laminations. In comparison, the molded magnetic flux channels allow the designer to modify the molded magnetic pole pieces to create shapes that are advantageous magnetically, which is not possible in the prior art using two dimension stamping.

Using the motor configuration of the present invention overcomes the problem of "Armature Reaction", by reducing the flux shift due to interaction of permanent magnets and flux of the stator which is a problem in prior art radially aligned phase motors. Another advantage of using this configuration is that there is no inter-reaction between phases as on conventional circuitry using sequenced stators and rotors. This allows near perfect timing of stator current to coincide with natural reverse EMF of stator by the simpler and more precise method of timing phase advance and current pulse waveform shaping and duration variation.

Phase windings may be individually driven by electronics, or may be WYE, STAR, or DELTA connected. In a preferred embodiment, each phase stator winding is separately driven by a square wave, sine wave, trapezoidal waveform, or a combination thereof from a motor full bridge power circuit, not shown. The parallel pole molded magnetic flux channels allow pole surface shapes to be properly shaped to control magnetic flux density to allow voltage waveforms to be sine wave, square wave, trapezoidal waveform, or a combination thereof. Unlike prior art motors, it is not necessary to use six-step trapezoidal power to run the motor although this type excitation can be used. During high torque starting, DC may be applied to all phase coils simultaneously, except the one phase while the passing magnet polarity reverses.

In an embodiment, a cooling, non-metallic hollow tube may be wound in the rows of molded magnetic flux channels to carry away the IR heat generated by the coil windings. In very large motors, hollow coil conductors may be used for the same purpose, with liquid coolant circulated through the coils.

A preferred embodiment is the "Wheel Motor" 100 shown in FIG. 1. In this embodiment, one or more large tubeless tires 210 are mounted on the circumference of the outer rotor, and in a preferred embodiment, the tire 210 may be inflated with part liquid along with gas inflation. Rotation of the wheel motor 100 causes the liquid to cool the rotor of the motor and the permanent magnets. This allows the use of lower cost neodymium iron boron magnets rather than the more costly samarium cobalt magnets. It is well known that neodymium magnets must not be allowed to get too hot or they may lose magnetism.

In alternative embodiments the motor is used for a track wheel or propeller hub motor. Other alternative applications include using the motor in any motor requiring high torque at low RPM without gearboxes, such as but not limited to, augers, elevator motors, and garage door motors and as a direct drive wind turbine dynamo.

Figure 6:
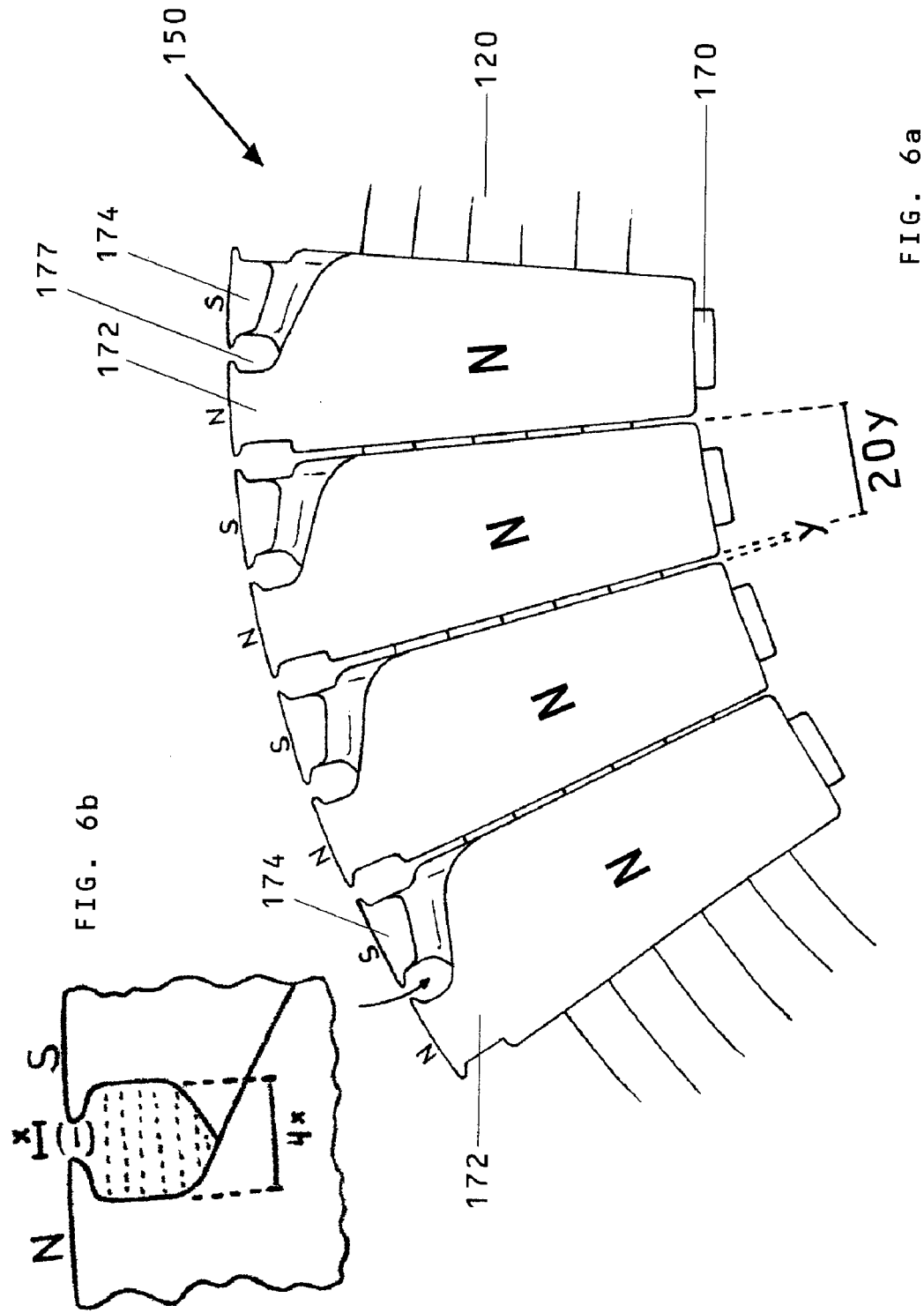
FIG. 6a is a side view of four consecutive Parallel Pole Molded Magnetic Flux Channels with transversely wound conductive wire being run through the winding tunnel.
FIG. 6b is an exploded view showing the magnetic flux in the air gap between a north and a south pole of a magnet.

FIG. 6*a* is a side view of four consecutive parallel pole molded magnetic flux channels with transversely wound conductive wire being run through the winding tunnel and FIG. 6*b* is an exploded view showing the magnetic flux in the air gap between a north and a south pole of a magnet. The work performed by this electric motor, whether as a dynamo or motor, occurs at the air gap 180 between the permanent magnets and the stator electromagnets as shown in FIG. 1. It is important to transfer nearly all the magnetic flux from the air gap to the transverse winding without losses as a dynamo, and as a motor, it is also important to transfer nearly all the magnetic flux from the transverse winding to the air gap.

Unlike prior art conventional laminated designs which reduce eddy currents in one plane, the molded magnetic flux channel reduces eddy currents in all directions and planes resulting in a reduction in eddy current heat loss and increased efficiency. As shown in FIG. 6*b*, at the poles, (N-S-N-S) there is a gap between poles of opposite magnetic polarity, labeled "X". This air gap may be on the order of approximately 0.100 inches, depending on the overall diameter of the stator. Unavoidably, there is a loss of magnetic flux between the facing edges of the two opposite poles. To minimize this unavoidable loss, the edge width is made the minimum that can convey flux to or from the air gap with the permanent magnets.

Between the poles, the remainder of the interleaved opposite magnetic polarity member is undercut, so that the distance between opposite pole surfaces is approximately four (4) times the top opening between the poles faces to minimize the flux loss between opposite poles of the main body of the poles.

Because the magnetic flux loss decreases as the square of the distance between the surfaces, by undercutting the interleaved facing opposite magnetic polarity surfaces so that the distance in increased by a factor of approximately four, decreases the magnetic loss by a factor of approximately sixteen.

Transverse winding with molded magnetic flux channels reduce the assembly labor cost by approximately 80%, due to "snap together" construction of Molded Magnetic Flux Channel parallel pole pieces. Looking at the width of the main body of the molded magnetic flux channel, labeled as 20Y in FIG. 6*a*, the gap Y between the adjacent molded magnetic pole pieces is the minimum required for assembly. There is no magnetic loss in gap Y because the magnetic polarity of the main bodies of the molded-magnetic flux channels is approximately the same at any moment of time. The figures show each molded-magnetic flux channel body as "North" with the present direction of current flow in the transverse coil. Since the ratio of the assembly gap Y to the average width of the main body 20Y is at least approximately a 20 to 1 ratio, at least 95% of the available flux is either captured or coupled to the magnetic pole air gap. This compares to less than 50% with prior art.

With molded-magnetic flux channels, nearly all of the flux is captured from, or delivered to, the conductors of the transverse coil. Most prior art configurations leave approximately half of the windings exposed resulting in the exposed flux not being coupled to or focused at the air gap where the actual force is created.

Figure 7:
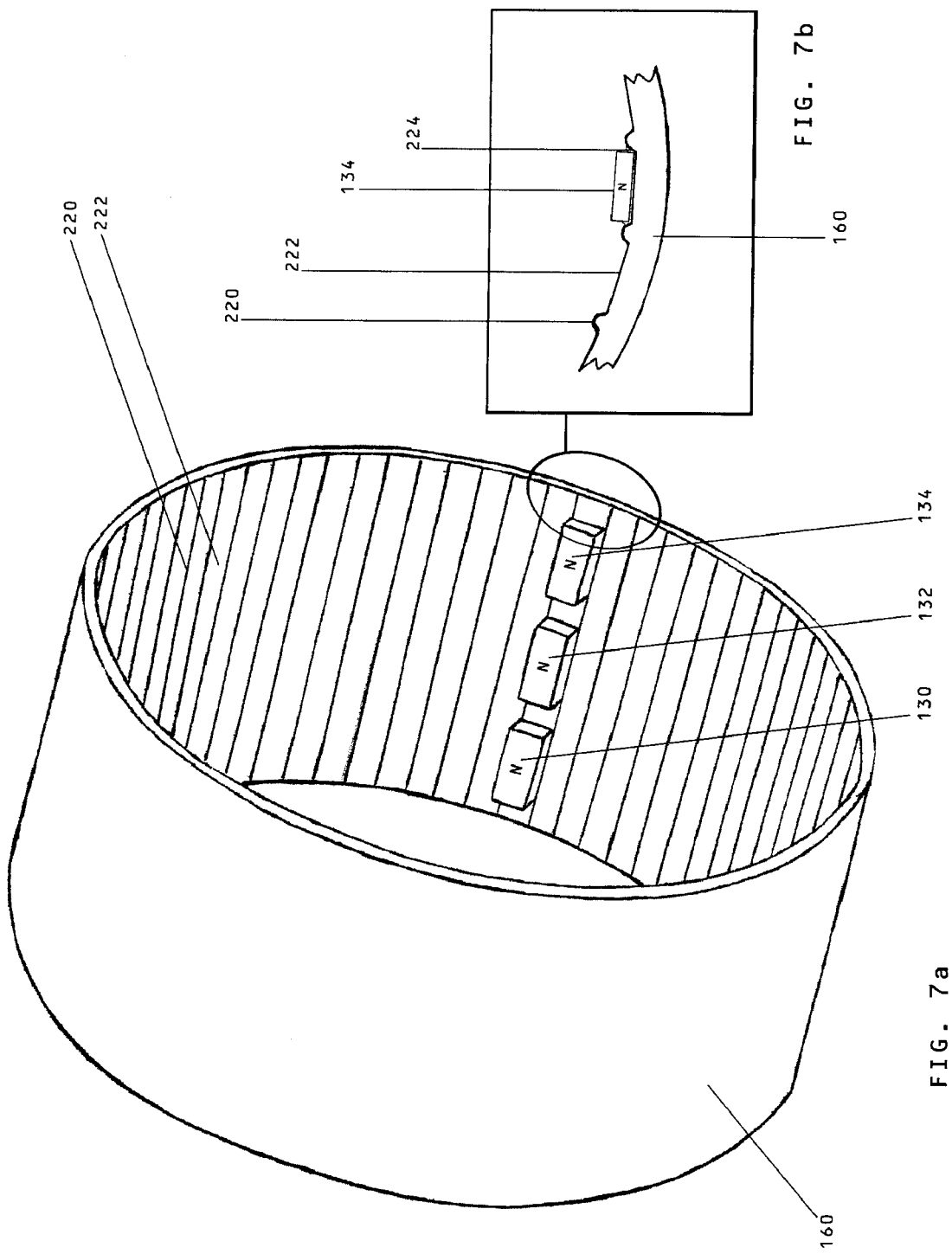
FIG. 7a shows the machining flat surfaces within the interior curved surface of the steel drum housing for attaching magnets.
FIG. 7b is a side view of a section of the curved magnetic drum with keying ridges between machined flat surfaces for positioning the permanent magnets.

FIG. 7*a* shows a machined flat surface 222 within the interior curved surface of the steel drum housing 160. As shown in FIG. 7*b*, keying ridges 220 are formed between the machined flat surfaces 222, which serve to precisely locate, key, and help attach the permanent magnets 134, by attachment with an epoxy type adhesive which in a preferred embodiment contains powdered iron. The adhesive is applied to the magnet mating surface and to the steel magnet housing surface prior to mating the permanent magnet 134 to its appropriate keyed location as shown in FIG. 7*b*. The exploded view shown in FIG. 7*b* is a close up of the normally curved inner surface 160 before and after the flat channel magnet-retaining channel 222 is machined, leaving the raised edges 220, which locate, key and attach the permanent magnets 134. This allows flat-sided magnets to be used, with shorter magnetic flux return path, allows stronger bond between magnets and housing, and mechanically keys the magnet into the precise alignment necessary for proper operation of the motor/dynamo.

High torque directly driven motor applications utilizing Molded Magnetic Flux Channels, Transverse Flux Stator Coils, a separate stator for each phase, Neodymium Iron Boron permanent magnets bonded with epoxy containing powered iron to axial mounting and alignment channels in rotating steel rotor drum according to the present invention provide performance with efficiencies up to approximately 99%.

In the preferred embodiment of the present invention, the motor 100 is a medium size motor with torque of approximately 20,000 ft. lbs. (27,137 NM) although the advantages apply to motors in the multiple mega watt MW range and as small as approximately 5 watts.

The present invention overcomes the problems with the prior art and provides a motor that achieves high efficiency, up to 99% has been demonstrated in experiments. The advantages of the novel motor includes near elimination of eddy current loses in stator; greatly reduced hysterisis losses in stator; significant reduction of conductor resistive (IR) losses; reduction of inductive losses; elimination of phase "armature effect" losses and previously required mechanical or hydraulic power transmission losses that were required by the prior art to achieve high torque with low RPM; and the motor of the present invention reduces complexity of the motor with a lower cost of construction of a Transverse Flux Motors.

Molded-Magnetic Flux Channels:

A preferred embodiment of the present invention provides methods, apparatus and systems for arranging and casting molded magnetic flux channels within a permanent female mold which ultimately houses and supports the stator assembly of a transversely wound stator. FIG. 5 shows a perspective view of a Parallel Pole Molded Magnetic Flux with the transversely wound conductive wire 120 running through the winding tunnel 175. The molded magnetic flux channel 150 is a uniquely shaped magnetic structure designed to capture, focus, and direct magnetic flux to or from a transverse wound stator to or from a magnetic air gap between the non moving stator and the moving rotor or armature. The mold can be built preferably by using 3-D rapid prototype machines, or cast by the lost wax technique. Alternative mold fabrication techniques will be obvious to those skilled in the art.

As shown in FIG. 6a, the "working magnetic air gap" 177 refers to the magnetic distance between the stationary pole pieces 172 and 174 of the molded magnetic flux channels 150 and the nearby moving permanent magnets 130, 132 and 134 shown in FIG. 2. The actual space may be air or may be part air and part mold shell material, which is magnetically and electrically inert.

Figure 8:
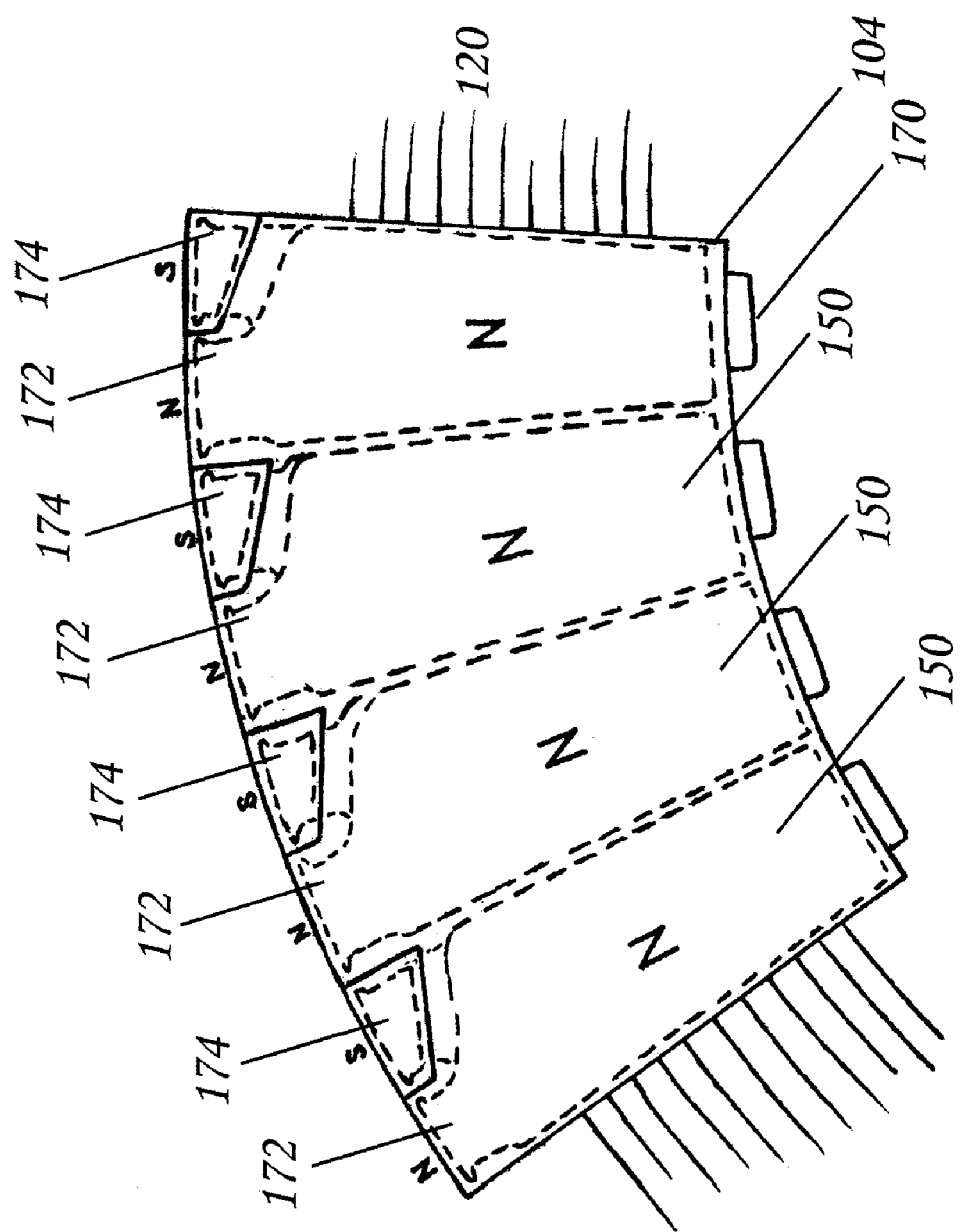
FIG. 8 is a side view showing a four pair section of a female mold and stator structure containing the four pair of Molded Magnetic Flux Channels.

FIG. 8 is a side view showing a four pair section of a female mold and integral stator structure 104 containing the four pair of Molded Magnetic Flux Channels 150 represented with dashed lines showing that the Molded Magnetic Flux Channels 150 are internal.

Figure 9:
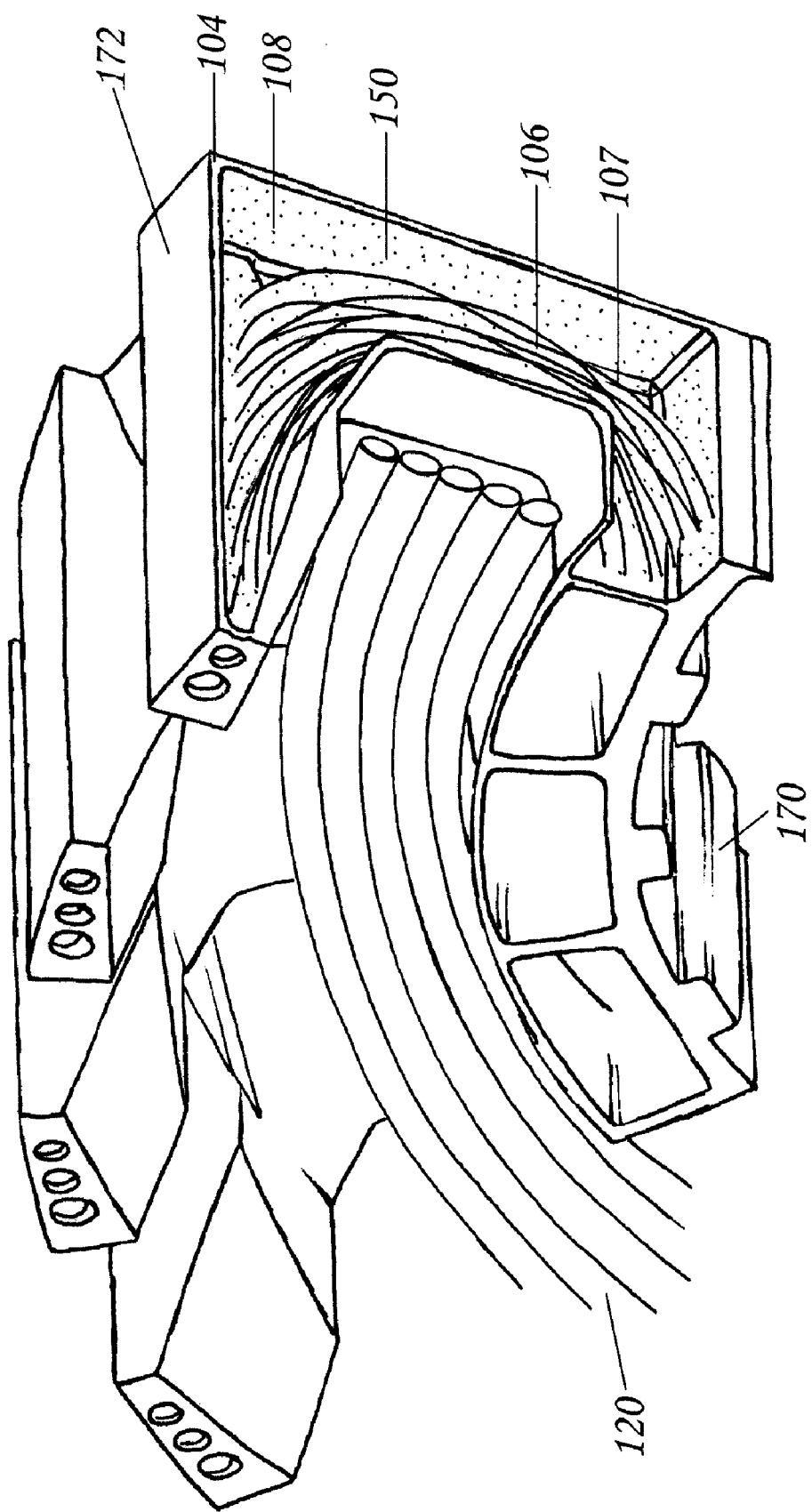
FIG. 9 a diagonal cut away view showing a section of a female mold and mounting structure.

FIG. 9 is a diagonal cut away view showing a section of a female mold and mounting structure which shows the Molded Magnetic Flux Channels 150, the outside surface of the magnetic circuit that was the outside dimensions, is now the inside dimensions of the female mold. Additionally, the air gaps 180 between poles which were later filled with epoxy material for strength are now filled with the outer surface of the mold. Therefore there are no air gaps between opposite poles. However, magnetically the air gaps still exist, but are filled with the magnetically inert, non conductive material, which is also the outside surface of the female mold.

The mold may contain a single Molded Magnetic Flux Channel 150, a group of Molded Magnetic Flux Channels, or the entire stator assembly ring of Molded Magnetic Flux Channels, depending on the size of the resultant motor and the size capabilities of the mold making machine. As shown in FIG. 9, the mold and stator housing structure 104 is integral to the Molded-Magnetic Flux Channel 150 and each Molded-Magnetic Flux Channel 150 contains high permeability bundle of insulated iron wires 106, high permeability bundle of insulated iron tape 107 and a matrix of high permeability powder and binder 108.

Figure 10:
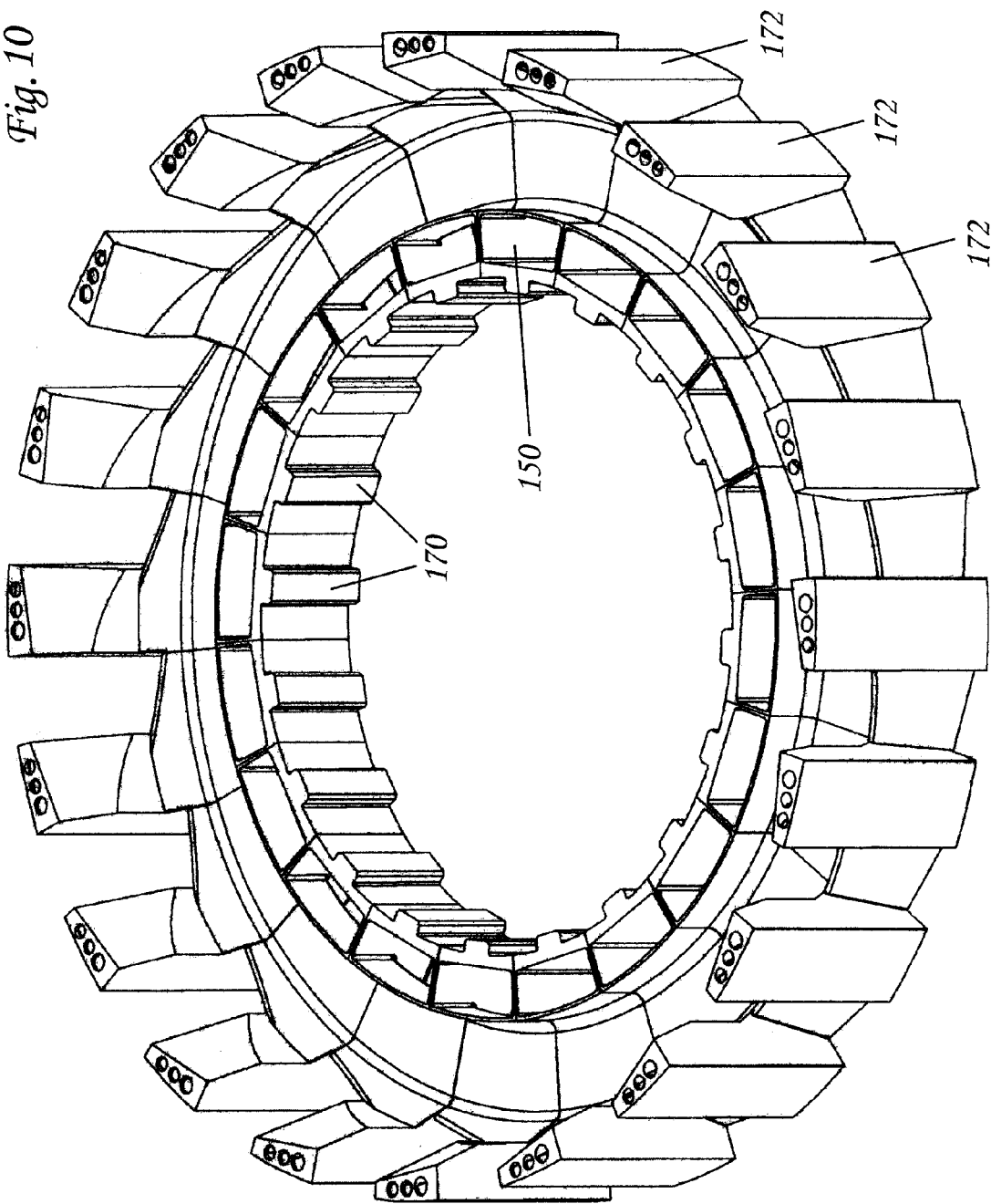
FIG. 10 is a diagonal view of an integrated female mold and support structure for one half of one phase stator.
Figure 11:
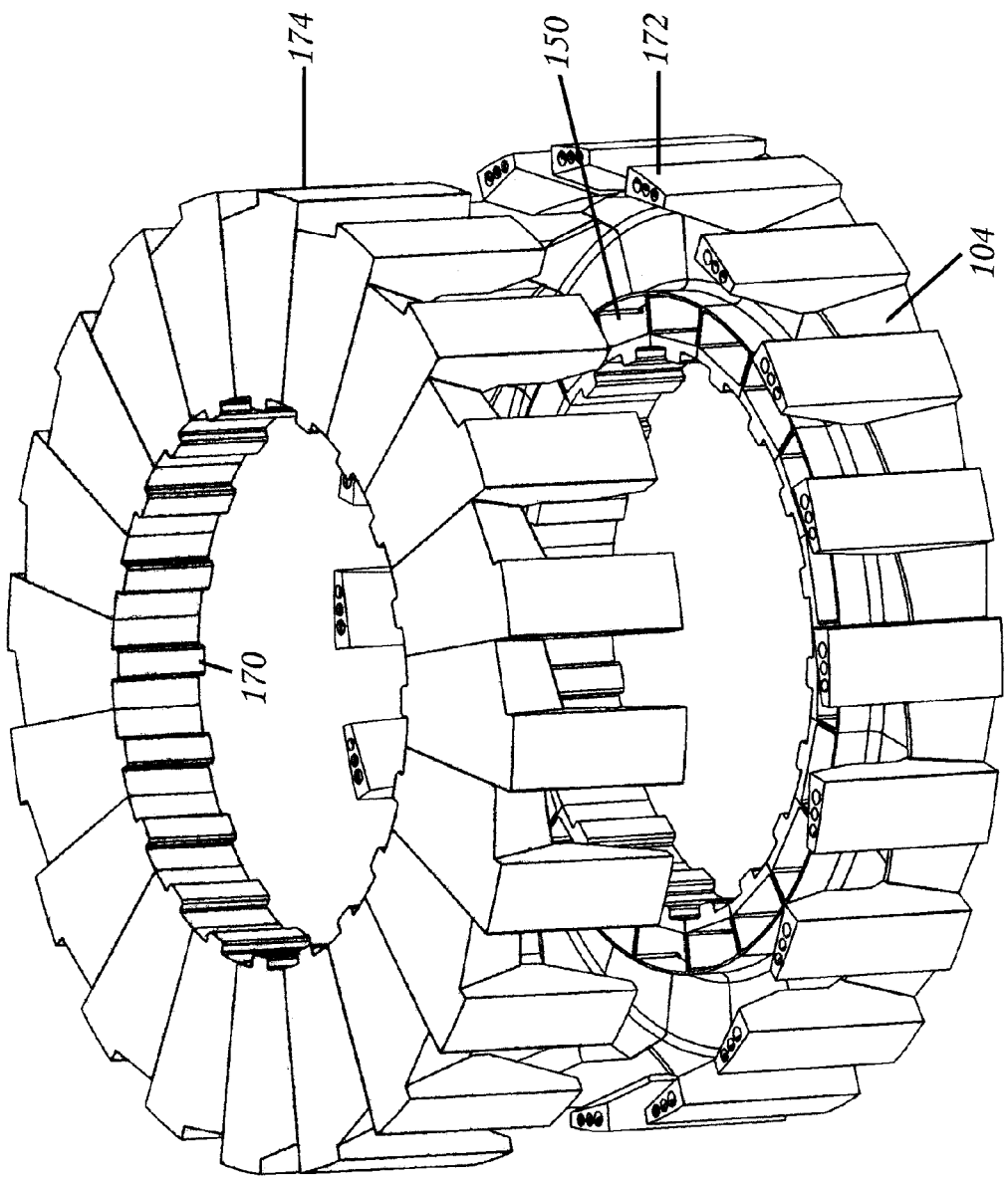
FIG. 11 is a diagonal exploded view of a mated pair of female molds and support structure for one stator phase.

FIG. 10 is a perspective view of an integrated mold and support structure for one half of one phase stator and FIG. 11 is a perspective view of a mated pair of molds and support structure for one stator phase. For clarity, the transverse winding is not shown in FIGS. 10 and 11. In a stator for a 22.5 inch wheel motor, having 40 magnetic poles per phase, the entire ring of 20 poles of Molded Magnetic Flux Channels 150 may be constructed in one piece, including the hub matching splines 170. By inserting the transverse winding 120 and assembling the mating half 174 as shown in FIG. 11, the stator for one phase is complete, with all 40 poles, and can be assembled onto the splined axle, without additional supporting parts. In another example, with a 132 inch wind turbine generator, the Molded Magnetic Flux Channels 150 are likely constructed in single, paired, or smaller groups, due to their size, until a large enough mold building machine becomes available. One ring of Molded Magnetic Flux Channels with a transverse stator winding is produced for each phase. For example, a three phase motor/dynamo, three stators are required, each having a ring of Molded Magnetic Flux Channels and a transverse stator winding.

The present invention provides a method of fabricating a magnetic flux channel 150 for a transverse wound electric motor 100 by forming a ring of plural adjacent molded magnetic flux channel pole pieces 172 and a second ring of opposite plural adjacent molded magnetic flux channel second pole pieces 174, each ring having a c-shaped recess. The two rings art mated such that each first pole piece 172 mates with one of the opposite pole pieces 174 to form magnetic flux channels 150 and the c-shaped recesses mate to form a winding channel for housing a transverse phase winding 120. After mating, the two rings are bonded together with a bonding agent to form a stator assembly of a transversely wound electric motor 100.

Two three-dimensional molds are created for forming the two rings of plural adjacent molded magnetic flux channel first pole pieces. In one embodiment the two rings are approximately identical. However, the two rings may be different as long as they mate to form the plural molded magnetic flux channels and the transverse phase winding channel. In an alternative embodiment, the female mold for the molded magnetic flux channels is pie shaped groups for assembly into a complete ring where large size does not permit building in a complete circle.

The method for fabricating the Molded Magnetic Flux Channels cast inside the stator mold support structure preferably begins with the design of the Molded Magnetic Flux Channels mold shell and stator hub assembly using a 3-D rapid prototyper and a 3-D drafting program, such as SolidWorks. The 3-Dimensional "printer" builds a female shell mold, complete with hub components, from a non-conductive material, such as ABS plastic, nylon, thermosetting resin, or other non-magnetic, non conductive, machine buildable material. Alternatively a lost wax casting, or other molding making technique that is known in the art, may be used to create the three-dimensional molds. The molds may be designed such that the molds form the outer surface of stator assembly of the transversely wound electric motor.

In a preferred embodiment, the three-dimensional molds are formed with an alignment protrusion 170 on an exterior surface the plural pole pieces 172 and 174 forming an interior perimeter of the rings for aligning the magnetic flux channels 150 with a hub of the transversely wound electric motor. The alignment protrusions 170 may be offset by calculating an offset according to 360 divided by the number of pole pairs, divided by a number of phases in a multiphase motor and offsetting the alignment protrusions to produce electrical phase difference between phases of the multiphase transversely wound electric motor. Alternatively, a mechanical offset is calculated by dividing 360 by one-half of a number of poles per phases in a multiphase motor to produce a quotient, dividing the quotient by a number of phases of a multiphase motor to produce the mechanical offset and offsetting the alignment protrusions to produce degrees of mechanical offset between phases of the multiphase transversely wound electric motor.

In another embodiment, the three-dimensional molds are designed as an outer shell of the stator assembly. In yet another embodiment, the mold design includes forming each molded magnetic flux channel first and second pole piece to have a rounded exterior surface opposite the c-shaped recess to prevent magnetic debris from entering the structure and a gap between mated first and second pole pieces. In yet another embodiment, the dimension of a transverse phase winding is determined and the c-shaped recess interior surface of the rings is designed to the dimensions of the transverse phase winding.

Referring back to FIG. 9, the hollow molded magnetic flux channels for the magnetic circuits have a bundle of high permeability insulated wires 106, or a bundle of high permeability insulated tapes 107, threaded and pulled through from the large junction to the pole pieces, or placed within the female mold before placement of a separate cover plate assembly (not shown). The hollow channels for the magnetic circuits are then filled with a magnetically high permeability powder 108, such as Sendust, Nickel-Iron powder, purified soft annealed iron, or similar powdered magnetic material. The mold shell, containing the powdered material 108 is spun at high speed, and the epoxy matrix is fed into and centrifuged into the hollow Molded Magnetic Flux Channels and it permeates the powered material. Alternatively, the epoxy material may also be permeated into the magnetic material using differential air pressure or gravity. When the epoxy sets, the stator half is complete. If ultra-violet cure resin us used, the large ends and transparent surfaces of the female mold of the Molded Magnetic Flux Channels are exposed to an intense source of ultraviolet light. The large end and the small end near the pole pieces are trimmed for a precise fit.

Referring to FIG. 11, two molded magnetic flux channel mating rings are made for each stator. The transverse winding is installed between the mating rings and then the mated rings are bonded together using a bonding material such as epoxy, filling all voids and forming one completed phase stator. The number of phases can be any integral quantity of phases. Most common are single phase, two phase or three phase. In an embodiment the mating step includes placing the transverse phase winding in one of the transverse winding channel formed by the c-shaped recesses in the first and second ring and filling the transverse winding channel with a filling material to encapsulate the transverse phase winding to form a solid filled transverse winding channel for dissipating heat. After the rings are mated, the rings are bonded together to form the molded magnetic flux channels. In an embodiment the rings are bonded with an epoxy to form one solid stator assembly of a transversely wound electric motor.

A mating pair of the rings as shown in FIG. 11 is required for each phase stator. For a three phase stator, each pair of stators is offset by 120 electrical degrees in the final assembly. This is accomplished by offsetting the splines of the hub by the required mechanical degrees according to the following formula:

360/Number of Pole Pairs/Number of Phases=Mechanical Offset in Degrees

In an embodiment, rather than producing the Molded Magnetic Flux Channels in a mold, and then removing the mold, the Molded Magnetic Flux Channels are produced within a female mold which becomes a permanent and integral part of the stator. A new mold is made for each stator and contains the mechanical parts of the support and the hub interface structure.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method of fabricating a magnetic flux channel for a direct drive parallel pole transverse wound electric motor comprising the steps of:

forming a first ring of plural adjacent molded magnetic flux channel first pole pieces, the plural adjacent pole pieces forming a first c-shaped recess, a top portion of first each pole piece having a width less than the width of a base portion and a length approximately double the length of the base portion for an approximately equal cross sectional area;

forming a second ring of plural adjacent molded magnetic flux channel second pole pieces the second ring a mirror image of the first ring, the plural adjacent pole pieces forming a second c-shaped recess, a top portion of first each pole piece having a width less than the width of a base portion and a length approximately double the length of the base portion for an approximately equal cross sectional area to decrease magnetic flux leakage and fringing;

mating the first and the second ring, each first pole piece mating with one of the second pole pieces with a gap between the top portion of the first and the second pole pieces to form the magnetic flux channel with each of the first and the second pole piece having an opposite polarity to capture flux of each rotating magnet when incorporated into the direct drive parallel pole transverse wound electric motor and the first and second c-shaped recesses mating to form a winding channel for housing a transverse phase winding; and bonding the first and the second ring with a bonding agent to form a stator assembly of the direct drive parallel pole transversely wound motor, wherein when the current through the transverse phase winding reverses the first and second parallel pole pieces switch polarity.

2. The method of claim 1, wherein the step of forming a first ring and a second ring comprises the steps of:

creating a first three-dimensional mold for forming the first ring of plural adjacent molded magnetic flux channel first pole pieces; and creating a second three-dimensional mold for forming the second ring of plural adjacent molded magnetic flux channel second pole pieces, the first and second three-dimensional molds forming a stator structure of the transverse wound electric motor.

3. The method of claim 2, wherein the step of creating a first three-dimensional mold and a second three-dimensional mold, comprises the steps of:

defining an outer dimension and geometry of the Molded Magnetic Flux Channel; and building the first and second three-dimensional mold with a 3-D rapid prototyper, or by using Direct Digital Manufacturing.

4. The method of claim 2, wherein the step of creating a first and a second three-dimensional mold comprises the step of:

using a lost wax casting to create the first and second three-dimensional mold.

5. The method of claim 2, further comprising the step of:

using the first and second first three-dimensional molds with the first and second ring of plural adjacent molded magnetic flux channel first and second pole pieces, respectively, as the stator assembly of the transversely wound electric motor to provide additional electrical insulation for the transverse phase winding and control the magnetic shape and the magnetic air gap of the completed motor/dynamo.

6. The method of claim 2, wherein the step of creating a first three-dimensional mold for forming the first ring and second ring of plural adjacent molded magnetic flux channel first and second pole pieces each further comprises the step of:

forming an alignment protrusion on an exterior surface the plural first and second pole pieces forming an interior perimeter of the first and second ring, wherein when the first and second ring align the magnetic flux channel with a hub of the transversely wound electric motor/dynamo.

7. The method of claim 6, further comprising the step of:

calculating an offset according to 360/divided by the number of pole pieces/divided by a number of phases in a multiphase motor/dynamo; and offsetting the alignment protrusions to produce a predetermined electrical phase difference between phases of the multiphase transversely wound electric motor.

8. The method of claim 6, further comprising the step of:

calculating a mechanical offset by dividing 360 by one-half of a number of poles per phases in a multiphase motor to produce a quotient;

dividing the quotient by a number of phases of a multiphase motor to produce the mechanical offset; and offsetting the alignment protrusions to produce degrees of mechanical offset between phases of the multiphase transversely wound electric motor.

9. The method of step 2, further comprising the step of:

designing each one of the first and second three-dimensional molds as an outer shell of the stator assembly.

10. The method of claim 2, further comprising the step of:

forming each molded magnetic flux channel first and second pole piece to have a rounded exterior surface opposite the c-shaped recess to prevent magnetic debris from entering the structure and a gap between mated first and second pole pieces.

11. The method of claim 2, further comprising the steps of:

determining a dimension of a transverse phase winding; and forming the c-shaped recess interior surface of the first and second ring to the dimensions of the transverse phase winding.

12. The method of claim 1, wherein the stop of forming a first and second ring of plural adjacent molded magnetic flux channel first and second pole pieces, respectively, includes the step of:

forming a set of pie-shaped female molds of molded magnetic flux channel for assembly into a complete ring.

13. The method of claim 1, wherein the mating of the first and second pole pieces form an air gap between the upper first and second pole pieces, the distance between interior interleaved opposing surfaces of the first and second magnetic body members forming the channel being approximately four times larger than the air gap between the upper north first and second pole pieces.

14. The method of claim 13, wherein forming the first and second ring of adjacent first and second pole pieces, respectively includes:

forming the interior facing surface of the first and second pole pieces to have an undercut face to reduce magnetic leakage between mated pole pieces.

15. The method of claim 1, wherein forming the first and second ring of adjacent first and second pole pieces, respectively includes:

forming the interior facing surface of the first and second pole pieces to have an undercut face to reduce magnetic leakage between mated pole pieces.

* * * * *